United States Patent
Becker et al.

(10) Patent No.: US 6,746,655 B1
(45) Date of Patent: Jun. 8, 2004

(54) METHOD FOR PURIFYING $SiO_2$-PARTICLES

(75) Inventors: Jörg Becker, Niddatal (DE); Joachim Nowak, Nidderau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/743,240

(22) PCT Filed: May 5, 2000

(86) PCT No.: PCT/EP00/04049

§ 371 (c)(1),
(2), (4) Date: Jan. 5, 2001

(87) PCT Pub. No.: WO00/68147

PCT Pub. Date: Nov. 16, 2000

(30) Foreign Application Priority Data

May 7, 1999 (DE) .......................... 199 21 059

(51) Int. Cl.⁷ ............................................. C01B 33/12
(52) U.S. Cl. ........................................ 423/335; 423/340
(58) Field of Search .................................. 423/335, 340

(56) References Cited

U.S. PATENT DOCUMENTS

| | | | |
|---|---|---|---|
| 2,233,155 A | 2/1941 | Adams | 23/182 |
| 4,983,370 A | 1/1991 | Loritsch et al. | 423/340 |

FOREIGN PATENT DOCUMENTS

| | | |
|---|---|---|
| BE | 366 384 A | 1/1930 |
| BE | 671 691 A | 4/1966 |
| DE | 144 868 A | 11/1980 |
| DE | 38 36 934 A | 5/1990 |
| DE | 198 13 971 A | 7/1999 |
| EP | 0 440 893 A | 1/1991 |
| EP | 0 901 989 A | 3/1999 |

OTHER PUBLICATIONS

Patent Abstract of Japan, vol. 14, No. 242, JP 02–064027, Shin Etsu Chem Co., May 23, 1990.
Patent Abstract of Japan, vol. 4, No. 026, JP 55–003353A; Nippon Tel. & Tel., Jan. 11, 1980.

*Primary Examiner*—Stanley S. Silverman
*Assistant Examiner*—Edward M. Johnson
(74) *Attorney, Agent, or Firm*—Tiajoloff & Kelly; Andrew L. Tiajoloff

(57) ABSTRACT

In a known method for the cleaning of $SiO_2$ grain, a fill of particles in a reactor having a vertically oriented center axis will be heated and simultaneously exposed to a treatment gas which is passed at a specified flow velocity from the bottom to the top through the reactor and the fill. To provide on this basis an improved cleaning method and a suitable simple device for it, it is proposed according to the invention and with regard to the cleaning method that a chloric treatment gas will be used which is set to a treatment temperature of at least 1,000° C. in the area of the fill, and that the flow velocity is set to at least 10 cm/s. With regard to the device according to the invention for the implementation of the method according to the invention, a gas shower is provided for the gas inlet, the gas shower comprising below the fill a multitude of nozzle openings distributed laterally to the center axis, for introduction of the treatment gas into the fill. The $SiO_2$ grain of naturally occurring raw material and cleaned according to the invention is characterized by an iron content of less than 20 ppb by weight, preferably less than 5 ppb; a manganese content of less than 30 ppb by weight, preferably 5 ppb; a lithium content of less than 50 ppb, preferably 5 ppb; as well as chromium, copper and nickel each with less than 20 ppb by weight, preferably 1 ppb.

12 Claims, 2 Drawing Sheets

METHOD FOR PURIFYING SIO₂-PARTICLES

Figure 1:
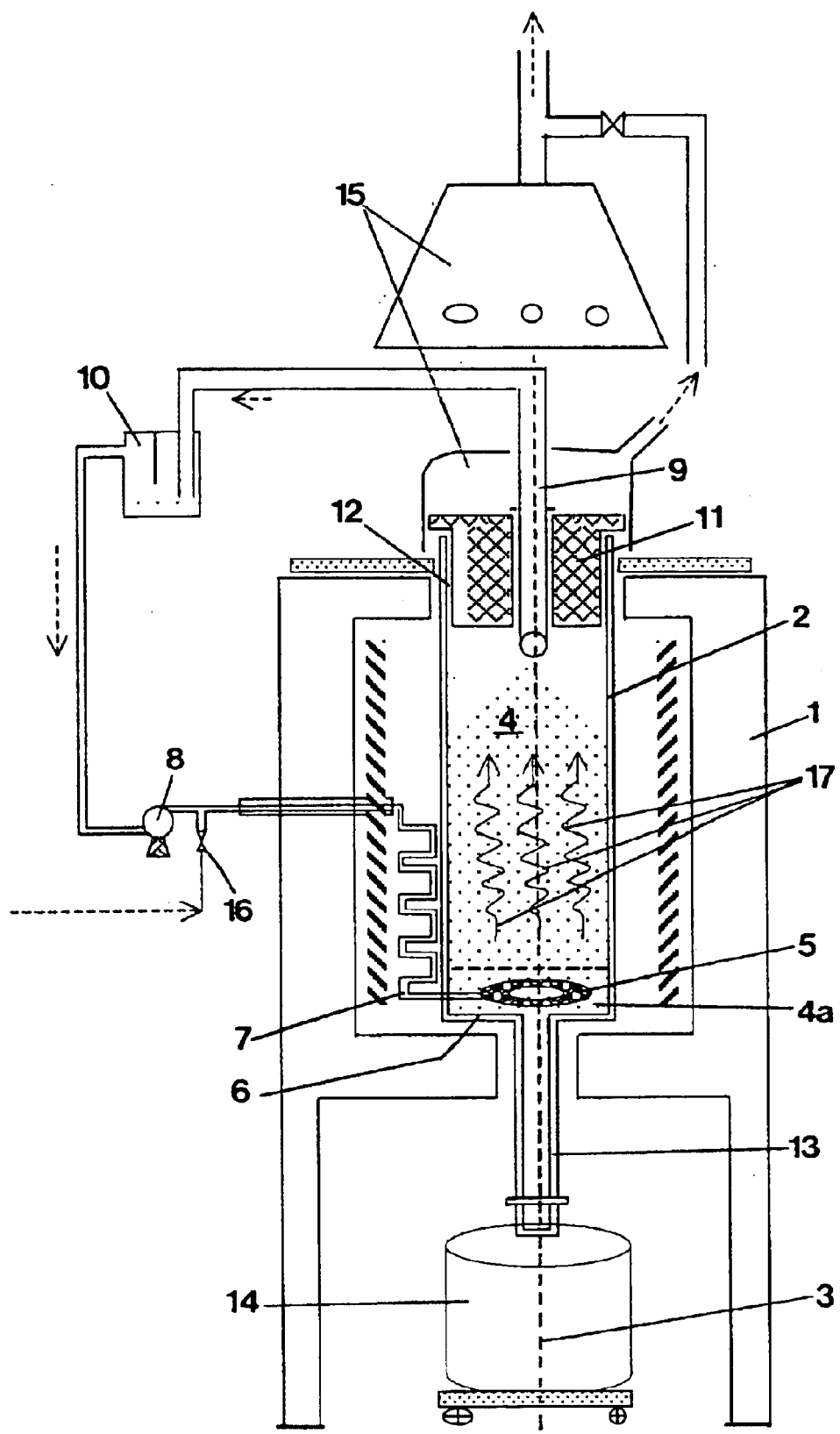

This invention concerns a method for cleaning the SiO₂ particles, by heating a fill of the particles in a reactor with a vertically oriented center axis and thereby exposing it to a treatment gas which is conducted at a given flow velocity from the bottom to the top through the reactor and the fill.

Furthermore, the invention concerns a device for the implementation of the method according to the invention, comprising a reactor with a vertically oriented center axis for accepting a fill of SiO₂ particles, with a gas inlet for feeding a treatment gas into an area of the reactor essentially below the fill, and with a gas outlet for discharging the treatment gas from an area of the reactor above the fill.

Moreover, the invention concerns cleaned SiO₂ grain from naturally occurring raw material.

From SiO₂ particles, quartz glass products are molten for the chemical and optical industry and for the manufacture of optical fibers and semiconductors. There are high requirements on the purity of the quartz glass products. Especially alkaline metals, alkaline earth metals, heavy metals, iron, carbon and free or combined water may have a detrimental effect on the desired properties of the quartz glass products. Correspondingly high are thus the purity requirements for the raw materials of quartz glass products. Quartz glass raw materials within the meaning of this invention are amorphous or crystalline particles, for example SiO₂ particles of naturally occurring quartz, or contaminated synthetically produced grains, granulates, or recycling material.

A method for the continued cleaning of quartz powder by means of thermochlorination has been described in EP-A1 737 653. It has been suggested therein to continuously feed the quartz powder to be cleaned, having a mean grain size ranging between 106 μm and 250 μm, into an electrically heated quartz glass rotary furnace in which it will pass in succession through a preheating chamber, a reaction chamber and a gas desorption chamber. In the preheating chamber, the quartz powder is heated to approx. 800° C. and is subsequently treated in the reaction chamber at a temperature of about 1,300° C. with a gas mixture of chlorine and hydrochloric gas. The alkaline and alkaline earth contaminations of the quartz powder here react with the chloric gas mixture, forming gaseous metal chlorides. The treatment gas and the gaseous reaction products will subsequently be exhausted.

The known cleaning method leads to a significant reduction of alkaline and alkaline earth contaminations in the quartz powder. The purity of the quartz powder can be yet improved even further by repeated passage of the cleaning process. However, in many quartz powder applications—such as for example as a starting material for quartz glass components in the use of semiconductor manufacture or for optics—the purity of the starting materials will be subject to extremely high requirements which cannot be achieved with the known method or only under great expenditure of time, material and cost.

With the known method, the cleaning effect depends on the reaction period of the quartz powder with the chloric gas mixture and on the reaction temperature. At higher temperatures, chlorine reacts faster with the metallic contaminations so that a better cleaning effect would have to be expected with increasing temperatures. However, at high temperatures, agglomerates will form due to the softening of the grain which will interfere with further access of the treatment gas to the surface of the individual grains. The cleaning effect by the treatment gas which primarily acts on the grain surface will thus be reduced. Furthermore, the cleaning effect depends on the dwell period of the quartz powder in the reaction chamber. Coarse grain powder usually passes the reaction chamber faster than fine grain powder. Thus, different purities may result which may even be different within one charge, depending on the temperature, the grain fraction or throughput. This complicates the reproducibility of the known cleaning method.

In the cleaning method according to DD-PS 144 868, fluid quartz sand Is continuously charged from above into a vertically oriented reactor. The quartz sand fill passes the reactor continuously from top to bottom. The quartz sand fill therein passes a heating up zone, a thermochlorination zone and a cooling down zone. To avoid oxygen from penetrating into the chlorination zone and thus to prevent the reformation of the chlorides formed during chlorination into metal oxides, an inert gas or nitrogen gas curtain is produced at the entrance area and at the exit area of the chlorination zone.

Wet chemical treatments are also customary for removal of contaminations on the surface of naturally occurring quartz sand. In such a method as is described for example in U.S. Pat. No. 4,983,370, the quartz sand is pretreated—prior to the cleaning process by thermochlorination—first by means of a two-stage flotation process, a magnetic separator and a subsequent caustic treatment in hydrofluoric acid.

A cleaning method and a device for the implementation of the method in accordance with the aforementioned species are known from EP-A 1 709 340. Therein is suggested to continuously feed SiO₂ powder, manufactured by means of flame hydrolysis, to a vertically oriented reactor to remove chlorine, and to treat the powder fill in a counter-current with a gas mixture of water vapor and air which is conducted through the reactor from the bottom to the top. In the area of the fill, the gas mixture has a linear gas velocity ranging between 1 and 10 cm/s and a temperature ranging between 250° C. and 600° C. The gas flow will flow through the fill forming a so-called "fluidized bed", and the fill will be slightly raised.

It has been shown that the degree of purity of the SiO₂ particles such as it is required for use in semiconductor and optical fiber manufacture cannot be achieved by means of the known methods. Especially the contaminations with the chemical elements Li, Na, K, Mg, Cu, Fe, Ni, Cr, Mn, V, Ba, Pb, C, B and Zr cannot be sufficiently removed by means of the known methods.

This invention is accordingly based on the task of providing an improved method for cleaning the SiO₂ particles and of also providing a suitable simple device therefor; as well as of specifying SiO₂ grain from naturally occurring raw material and cleaned by using the method according to the invention, such grain being particularly suitable especially for the manufacture of semi-finished or finished quartz glass products for semiconductor and optical fibers production.

In view of the method, this task is solved in accordance with the invention such that a chlorous treatment gas is being used that—in the area of the fill—is adjusted to a treatment temperature of at least 1,000° C. and to a flow velocity of at least 10 cm/s.

A chlorous treatment gas is used. Many of the contaminations contained in SiO₂ particles react with the treatment gas at temperatures of above 1,000° C. to form gaseous metal chlorides or other volatile compounds which can be exhausted from the reactor via the exhaust gas. Aside from a chlorous component, the treatment gas may contain additionally other components—such as fluorine, iodine or bromine, inert gases or hydrogen for example—which are specially suitable for the removal of specific contaminations or for adjustment of specific properties of the SiO₂ or for the heat transfer between treatment gas and particles. For economic reasons, free chlorine is undesirable in the treatment gas so that the chlorous component will contain chlorine in a combined but reactive form.

The treatment gas will be passed through the fill at a flow velocity of at least 10 cm/s. This will ensure that gaseous compounds of the contaminations will be removed as fast as possible from the particles and discharged from the reactor. Moreover, due to the fast gas exchange, the $SiO_2$ particles are continuously and fast provided with unspent treatment gas so that the rate of chemical reaction between treatment gas and contaminations is as high as possible. Decisive will here be the flow velocity in the area of the fill. It should here be noted that, with the fill, the free flow cross-section versus the empty reactor will be reduced and the flow velocity accordingly increased. Here, and in the following, "fill" is to mean a bulk deposit of still to be cleaned $SiO_2$ particles in the reactor.

In the area of the fill, a treatment temperature of at least 1,000° C. is adjusted for the treatment gas. Contaminations can generally be removed from the particles the easier and faster, the higher the treatment temperature. Since contaminations react with the treatment gas on the free surface of the particles, it is required that the contaminations come to the surface. This is done essentially by diffusion. The contaminations show specific diffusion speeds in the $SiO_2$ particles; however, a higher treatment temperature will principally also achieve a higher diffusion speed. Moreover, due to the higher temperature, the speed of reaction between treatment gas and contaminations is increased. However, at very high treatment temperatures, there is the risk that the particles will agglomerate in the fill so that not only the fluidity of the fill will be reduced but also the cleaning effect of the treatment gases will be reduced as well due to fewer surfaces being free. With regard to this, there is an upper limit for the treatment temperature of about 1,400° C.

The treatment gas will be adjusted to the treatment temperature. $SiO_2$ particles will be heated up by the treatment gas to the treatment temperature or kept at the treatment temperature. Accordingly, the temperature of the treatment gas is at least as high as that of the particles. Thus will be prevented that gaseous components condense out of the treatment gas and thus will also be prevented a concurrent adsorption or absorption of contaminations on the particles or, respectively, into the particles.

The method is suitable for a batch-wise as well as a continuous cleaning of the particles. Taking into account the specific reaction temperatures for contaminations with Li, Na, K, Mg, Cu, Fe, Ni, Cr, Mn, V, Ba, Pb, C, B and Zr, the purities achievable with the method according to the invention are always in a sub-ppb range.

It has proven particularly advantageous to adjust the temperature of the treatment gas to at least 1,200° C. in the area of the fill. The higher the treatment temperature is adjusted in the area of the fill, the easier and faster contaminations can be removed for the reasons above explained in detail. The treatment temperature from which a significant reaction can be observed between a contaminating element and the treatment gas (reaction temperature) is specific to the element. Thus, sodium contaminations for example can already be significantly reduced at temperatures of approx. 1,000° C. with the chlorous treatment gas, whereas higher temperatures of at least 1,050° C. are more favorable for the removal of lithium contaminations.

Advantageously, the treatment gas is introduced into the fill such that it will lift it by producing a fluidized particle layer (fluidized bed). The treatment gas will largely flow laminarly through the fluidized particle layer. This will achieve a homogeneous gas distribution in the fill so that the particles are homogeneously charged with the treatment gas. Blind spots in the area of the $SiO_2$ particle layer will be avoided as far as possible so that the contaminations are able to react completely and uniformly. This will achieve a cleaning effect by the treatment gas which is done as completely and uniformly as possible. Moreover, due to the fact that the individual particles of the fill are kept moving in the fluidized bed, the risk of sintering of the particles will be reduced so that the treatment temperature can be set higher.

Maintenance of the most laminar flow possible within the fill will be made easier if the treatment gas is already introduced into the fluidized particle layer in the form of the most laminar gas flow possible. This procedure wherein the laminar flow is already produced below the fill of the particles to be cleaned has proved advantageous especially for the removal of lithium contaminations.

A procedure is preferred wherein the treatment gas is heated, prior to its introduction into the fill, to the treatment temperature or to a temperature above the treatment temperature. Here, the treatment gas will expand to a multiple of its volume at normal temperature. The volume increase is concurrent with a corresponding increase of the flow velocity of the treatment gas. This will facilitate the formation of a fluidized particle layer and a largely laminar flow of the treatment gas through the fill. Moreover, due to the preheating of the treatment gas, the above mentioned condensation effects will be avoided. Due to the contact with the somewhat colder $SiO_2$ particles, the treatment temperature in the treatment gas will come about in the area of the fill.

It proved to be particularly advantageous to use pure inorganic hydrochloric gas as the treatment gas—apart from the inert gases. Such treatment gas contains in particular the lowest possible components with an oxidizing effect—such as oxygen—so that the formation of chlorine in the waste gas of the treatment gas can be largely prevented. This will make a chlorine degassing of the waste gas unnecessary so that its disposal or recycling will be simplified. For example gas scrubbers can be done without, such as they are used with the known cleaning processes for chlorine degassing. Advantageously, such hydrochloric gas contains a stoichiometric excess of elementary hydrogen. Excess hydrogen will react with OH groups in or on the $SiO_2$ particles to form water which is carried as water vapor with the gas flow so that the OH content of the particles can be reduced.

It proved to be successful to introduce the treatment gas into the fill by means of a gas shower having numerous nozzle openings below the fill which are distributed laterally to the center axis. Underneath the fill of the particles to be cleaned, the gas shower has nozzle openings which are essentially symmetrically distributed over the cross-section of the fill—viewed in direction of the flow—and from which the treatment gas will flow. Due to the gas flow applied in an area at the start of the fill, the fill is laminarly passed through in a more or less straight line, and a uniform and homogeneous treatment of the particles over the entire fill will be ensured.

Advantageously, the particles are heated to a temperature in the area of the treatment temperature with the exclusion of air and oxygen. With this procedure, any oxygen or air existing in the fill or in the reactor will be replaced by another gas prior to the heating of the particles, for example by an inert gas or by a treatment gas which, apart from contaminations, is free of oxygen and nitrogen. This will prevent that stable combinations of contaminations in the form of nitrides or oxides will be formed at higher temperatures which can no longer be removed subsequently by the treatment gas. Due to the air and oxygen exclusion, a redox reaction with HCl-containing treatment gas is suppressed which can result in the formation of chlorine gas. As already explained further above, the processing or degassing of the treatment gas would then become considerably more expensive.

In a preferred method, the treatment gas is simultaneously used for air sifting of the fill. For many applications, the removal of the fines content of a grain is desirable since the fines may result in fine bubbles of the quartz glass. By adjusting the flow velocity of the treatment gas, this fines content can be defined and removed from the fill and discharged from the reactor. At the same time, a defined grain fraction can thus be obtained.

Advantageously, a first cleaning stage will be provided for the removal of metallic contaminations or their compounds, especially sodium, manganese, potassium and iron contaminations, and a second cleaning stage for the removal of carbon and carbon compounds. During the second cleaning stage, an oxygen-containing gas is charged to the treatment gas; whereas in the first cleaning stage, an oxygen containing gas is avoided as far as possible. Carbon could cause gas inclusions during the melting of particles so that, during the second cleaning stage, carbon is made to react with oxygen to CO or $CO_2$ and will be removed from the fill.

In a particularly economic process, the treatment gas is run in circulation. Here, the waste gas leaving the reactor is regenerated and again charged to the reactor as a treatment gas. For balancing any gas consumption, regeneration may comprise an admixture of fresh, unused treatment gas.

One procedure proved especially favorable where the flow velocity of the treatment gas is adjusted to at least 30 cm/s. Due to the high flow velocity, the gas exchange will be Increased. The advantages explained in detail above, with regard to the discharge of contaminations and high reaction speeds between the treatment gas and the contaminations, will be further promoted by maintaining a fluidized bed of the fill (fluidized particle layer).

With regard to the device, the above specified task is solved in accordance with the invention by the gas inlet comprising a gas shower, having—below the fill—a multitude of nozzle openings laterally distributed toward the center axis, for introducing the treatment gas in the fill.

Due to the fact that a gas shower is arranged below the fill, a laminar flow can be produced below the fill, and the treatment gas can be introduced into the fill in the form of a gas flow which is as laminar as possible. Thus, maintenance of the most laminar flow possible within the fill will be facilitated.

The gas shower comprises a multitude of nozzle openings distributed laterally to the center axis. The nozzle openings are essentially distributed symmetrically about the center axis and uniformly over the cross section of the fill—seen in the direction of flow. Due to the gas flow designed in such a laminar fashion at the beginning of the fill, the gas will flow laminarly and more or less in a straight line through the fill, and a uniform and homogeneous treatment of the particles over the complete fill will be ensured.

Advantageously, the gas inlet comprises a gas heating device which is arranged before the gas shower—seen in the direction of flow of the treatment gas. Thus, the treatment gas can be heated—prior to introducing it into the fill—to a temperature of above the treatment temperature. The effect and the special advantages of this procedure are explained above in more detail on the basis of the method according to the invention.

Especially simple in design is a gas heating device which is formed as a heated tubular coil. By means of the tubular coil, the adjustment of the treatment gas to the treatment temperature can be easily realized by adjusting their lengths to the requirements. The length of the tubular coil is commonly in the range of a couple of meters. It can be arranged in a furnace in which the reactor is located as well, and it consists of a high-temperature resistant material, preferably quartz glass.

The gas shower also consists of a temperature resistant material, for example of quartz glass, silicon carbide or a precious metal, such as platinum or a platinum alloy. In the simplest case, the gas shower is designed in the form of a tube provided with nozzle openings. The tube may have a multitude of forms, for example, the form of a spiral. The gas shower may also be designed as a perforated plate or a frit.

Production of a laminar gas flow will be facilitated if the nozzle openings of the gas shower are symmetrically distributed about the center axis of the reactor. For example, the nozzle openings can be uniformly arranged in annular form around the center axis, with adjacent nozzle openings advantageously having the same distance to each other.

A reactor proved to be especially advantageous which is closable on all sides. Thus, the introduction of oxygen or nitrogen and the resulting risk of the formation of chlorine and thermochemically stabile compounds of contaminations, such as nitrides or oxides, will be prevented.

With regard to the $SiO_2$ grain, the above specified task is solved in accordance with the invention by the $SiO_2$ grain of naturally occurring quartz having an iron content of less than 20 ppb by weight, preferably less than 5 ppb by weight; a manganese content of less than 30 ppb by weight, preferably less than 5 ppb by weight; and a lithium content of less than 50 ppb. by weight, preferably less than 5 ppb by weight, as well as a content of chromium, copper and nickel of each less than 20 ppb by weight, preferably less than 1 ppb.

The $SiO_2$ grain according to the invention is manufactured from natural quartz grain or pretreated quartz grain such as for example commercially sold precleaned grain or it is manufactured from granulate, with such quartz grain being cleaned by means of the method according to the invention. The natural $SiO_2$ grain thus manufactured excels by purities which are otherwise only achievable with synthetically manufactured $SiO_2$. It is thus especially suited as a material to be used for the manufacture of high-purity quartz glass. For example for the manufacture of quartz glass crucibles, bars, rods, plates which are used as components or semi-finished products for the semiconductor industry, for optics and optical communications systems.

Figure 2:
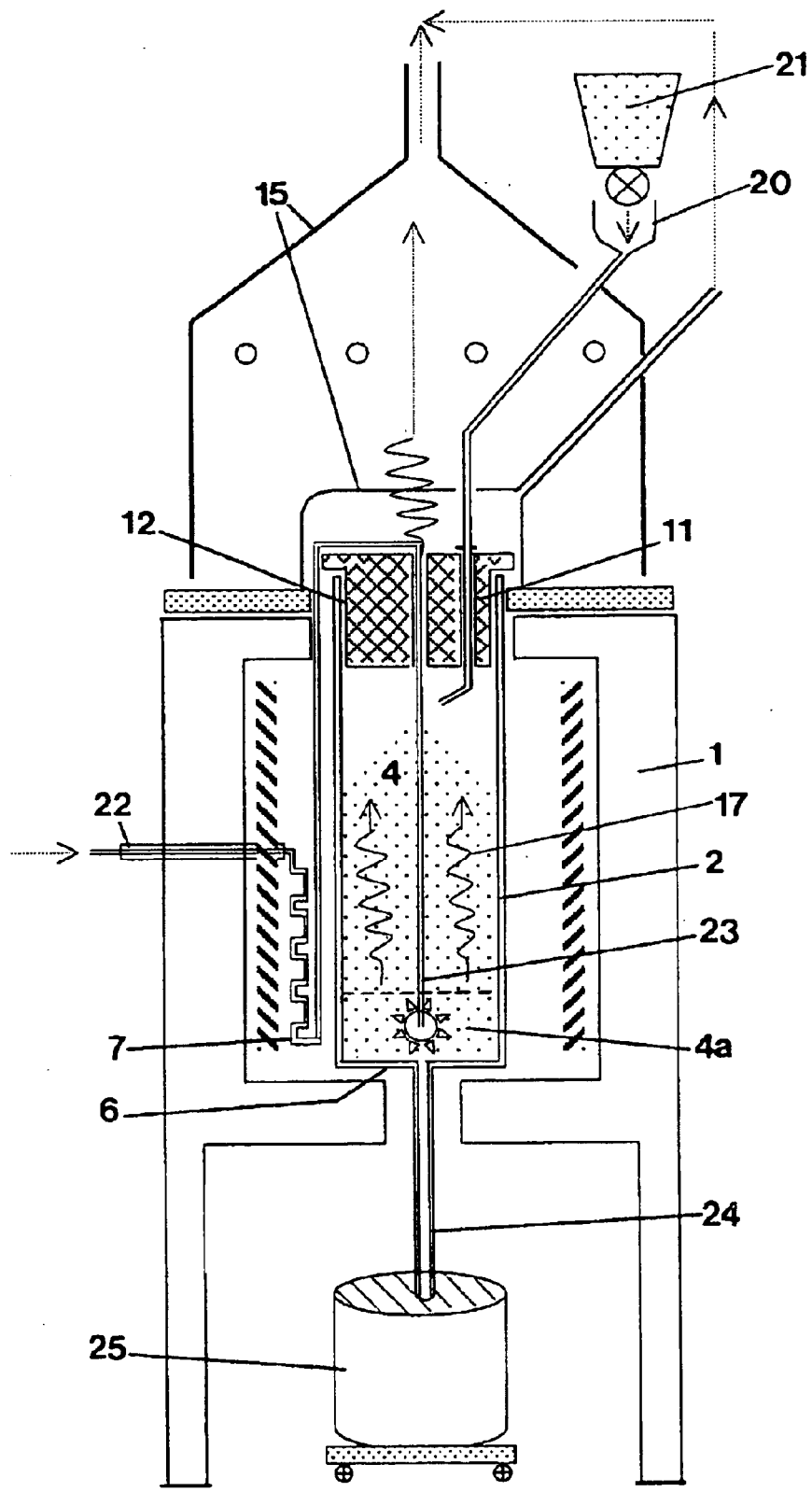

Hereinafter, the invention is explained in greater detail on the basis of embodiments and one drawing. The drawing shows in detail and in diagrammatic presentation:

FIG. 1 an embodiment of the device according to the invention which is suitable for a batch-wise cleaning method according to the invention; and FIG. 2 a device which is suitable for a continuous cleaning method according to the invention.

For the device according to FIG. 1, a cylindrical reactor 2 of quartz glass with a vertically oriented center axis 3 is arranged within an electrically heatable chamber furnace 1. The reactor 2 has an inside diameter of 14 cm and a height of about 150 cm. It contains a fill 4 of fluid quartz grain. The lower part of reactor 2 is provided with an annular shower 5 made of a quartz glass tube arranged coaxially to the center axis 3 on the bottom 6 of the reactor 2 and which is provided with 100 nozzle holes in the direction of the reactor's underside. The nozzle openings each have a diameter of 500 $\mu$m and are uniformly distributed at a distance of approx. 2.5 mm on an enveloping circle with a diameter of about 7 cm. The annular shower 5 is arranged via a 10 m long tubular coil 7 which is arranged inside the chamber furnace 1 but outside the reactor 2 and is connected with a gas circulating pump 8. By means of the gas circulating pump 8, a treatment gas is introduced into reactor 2 via the tubular coil 7 and the annular shower 5. In the upper part of the reactor 2, a waste gas line 9 is provided which is connected via a dust separator 10 with the gas circulating pump 8. The waste gas line 9 here extends through a bore of a quartz glass plunger 11 which seals off the reactor 2 toward the top, except for a narrow annular slot 12 between quartz plunger 11 and waste gas line 9. On the bottom 6 of reactor 2, a closable drain connecting piece 13 is provided for batch-wise discharge of cleaned quartz grain into a vessel 14. An exhaust 15 is provided above furnace 1 and reactor 2.

Hereinafter, the method according to the invention is described in more detail on the basis of the embodiments and the presentation in FIG. 1.

EXAMPLE 1

The quartz grain to be cleaned according to Example 1 is an already precleaned grain of naturally occurring quartz sand which is commercially obtained under the designation of "IOTA Standard" (supplier company Unimin Corp., USA). This quartz grain has a mean grain diameter of about 230 $\mu$m with the fines percentage with grain diameters of below 63 $\mu$m being approx. 1 to 2% by weight. The contaminations measured in this quartz grain are specified in Table 1 in the line "Standard".

On a base layer 4a of prior cleaned quartz grain, a batch of about 16 kg of the quartz grain to be cleaned is filled into reactor 2 to a loose fill 4; with a fill height of about 60 cm resulting for the base layer 4a and the fill 4. The top edge of base layer 4a whose grain just covers the annular shower 5 is presented in FIG. 1 by means of a dashed line. The annular shower 5 is arranged below the fill 4. During the filling, reactor 2 is flushed with a gas which is free of oxygen and nitrogen and subsequently closed with the quartz glass plunger 11. In Example 1, the flushing gas is a pure inorganic HCl gas with a stoichiometric excess of hydrogen which is also used as the treatment gas for cleaning of the quartz grain during the following first cleaning stage. Already while the reactor 2 is filled, and especially prior to the heating of the quartz grain, the continuous gas scavenging will largely expel oxygen and nitrogen and prevent entry of air into reactor 2. Thus can be prevented that thermally and chemically stable compounds will be formed of the contaminations to be removed in the form of metal nitrides or metal oxides. Such temperature-resistant metal nitrides or metal oxides which are formed at higher temperatures for example due to chemical reaction, phase conversion or due to so-called aging may directly or indirectly result in undesirable contamination effects in quartz glass and in obtrusive discolorations or transmission changes. As examples for this can be named lithium nitride, iron oxide or manganese dioxide. A typical contamination of the natural quartz grain is iron trioxide which can be available in three different modifications. One thereof is the reddish brown rhombohedral $\alpha$-$Fe_2O_3$. It has been shown that the acid resistance and hardness of $\alpha$-$Fe_2O_3$ will decisively depend on its thermal pretreatment. Lightly annealed $\alpha$-$Fe_2O_3$ is easily dissolved in acids and can be easily removed with the treatment gas here used. On the other hand, $\alpha$-$Fe_2O_3$ which was annealed at temperatures of above 1,000° C. and was thus thermally aged will be characterized by high resistance to acids, bases and chlorine and can thus no longer be entirely removed with the treatment gas. Accordingly, with the method according to the invention, the non-annealed $\alpha$-$Fe_2O_3$ is already completely removed as far as possible at temperatures of about 1,000° C. by the fill 4 being treated with the treatment gas already from the time of filling the reactor 2 and even during the heating up period.

Another typical contamination in natural quartz is manganese which is generally available as manganese dioxide ($MnO_2$, brownstone). When heating in the air or under oxygen at temperatures of over 550° C., $MnO_2$ converts to $Mn_2O_3$ which is converted into its alpha form ($\alpha$-$Mn2O_3$) as a brown colored modification and, after annealing at a temperature of above 900° C., it is converted to the chemically more stable trimanganese tetraoxide ($Mn_3O_4$). Here too, it proves to be advantageous to prevent oxygen from being present already during the filling and heating up of reactor 2.

For heating the fill 4, the chamber furnace 1 is set to the treatment temperature of 1,270° C. At the same time, the treatment gas is charged via the annular shower 5 into the reactor 2, at a preliminary pressure of 0.7 bar (at room temperature) and a flow rate of 1,300 l/h. The treatment gas is preheated to the treatment temperature by running it past the heating elements of chamber furnace 1 within the tubular coil 7. Its volume will increase by a multiple. On a purely calculated basis, the treatment gas achieves a flow velocity of approx. 12 cm/s in the empty reactor 2. The gas flow emanating from the annular shower 5 will slightly lift up the fill 4, thus forming a fluidized bed where it flows largely laminarly, and—due to the narrowed free flow cross-section because of the quartz grain—it will flow through the bed at a mean flow velocity of about 60 cm/s, heating it at the same time to a temperature of about 1,270° C. The essentially laminar gas flow is indicated by the directional arrows 17. The fluidized bed, the laminar gas flow 17 and the high flow velocity of the treatment gas will ensure an effective, uniformly thermal and chemical treatment of the quartz grain and thus an optimum cleaning effect while preventing a sintering of the grains among each other. Condensation effects are prevented by preheating the treatment gas. The high flow velocity ensures fast gas exchange and a fast discharge of contaminations away from the individual grain and from the reactor 2. Moreover, the fines part of the quartz grain from fill 4 is removed as finest dust via the gas flow 17—as a function of the set flow velocity. The treatment gas is circulated and regenerated thereby. For this, the treatment gas burdened with contaminations and finest dust is discharged from the reactor 2 via the waste gas line 9 and passed to the dust separator 10. The treatment gas will cool down so that volume and accordingly the flow velocity will be reduced. The finest dust and contaminations which are present in the form of condensed compounds will be removed in the dust separator 10. Subsequently, the cleaned treatment gas is returned again to reactor 2 via the gas pump 8. A small quantity of pure HCl gas is continuously added to the treatment gas, as is symbolized by the shutoff valve 16. Excess treatment gas will continuously escape from the reactor 2 through the annular slot 12 and will be removed via drain 15. This will prevent any air and oxygen from entering the reactor 2 so that oxidation of HCl with the formation of chlorine gas will be prevented.

After a treatment time of 23 hours, the fill 4 is freed from carbon and carbon compounds by adding oxygen for a short time to the treatment gas.

The cleaned quartz grain is discharged via connecting piece 13 into the vessel 4 and cools off. In the accordingly treated quartz grain, the concentrations of contaminations of Li, Na, K, Mg, Cu, Fe, Ni, Cr, Mn, V, Ba, Pb, C, B and Zr are each in the ppb range and partly below the detection limit of ultra tracing analytical instruments. A chemical purity is thus achieved which is otherwise only known from synthetically manufactured grain. Table 1 lists under Example 1 the contamination contents measured in the quartz grain cleaned according to the invention.

The presentation in FIG. 2 is using the same reference figures as in FIG. 1 for designation of the same or equivalent components or parts of the device. Reference is made to the corresponding explanations for FIG. 1.

The device presented in FIG. 2 is designed for a continuous operation of the method according to the invention. For this, a filling device 20 is provided for the continuous addition of fluid quartz grain 21 to the reactor 2, and a drain connecting piece 24 is also provided on the bottom 6 of reactor 2 which opens up downwardly into a closed vessel 25 so that continuously cleaned quartz grain flows from reactor 2 into the vessel 25. Differences to the device according to FIG. 1 are also in the inlet of the treatment gas into reactor 2 and in the outlet from reactor 2. Treatment gas is passed to a quartz glass tube 23 via a gas inlet 22 and the tubular coil 7, the tube protruding from above into the fill 4 down into the area of the floor 6 of reactor 2. Underneath the quartz glass tube 23—symbolized by a dotted line—there is a sublayer 4a of already cleaned quartz grain. The bottom part of the quartz glass tube 23 is perforated over a length of 10 mm with several holes uniformly distributed around the circumference; their opening cross sections altogether coming to about 4 mm². As symbolized by the star-shaped sign, the treatment gas emanates from the holes in axial symmetry; it is introduced into the fill 4 to be cleaned; it flows contamination contents of the quartz grain cleaned according to Example 2 are listed in Table 1 under "Example 2". It is once more pointed out here that the contaminations of the $SiO_2$ grain have different retention times so that the above specified treatment times will vary depending on the specific purity requirement. For example, a purity requirement with regard to a sodium content of less than 20 ppb by weight would be met already after 60 minutes with the method according to Example 2 in accordance with the invention.

TABLE 1

|  | Li | Na | K | Mg | Fe | Cu | Ni | Cr | Mn | Ba | V | Zr | Ca | Ti | Al |
|---|---|---|---|---|---|---|---|---|---|---|---|---|---|---|---|
| Standard | 750 | 1240 | 980 | 35 | 410 | 10 | 10 | 14 | 90 | 10 | 10 | 1150 | 560 | 1000 | 15000 |
| Exp. 1 | <3* | <10* | <10* | <5* | <10* | <3* | <1* | <1* | <2* | <20* | <1* | <100 | 160 | 1000 | 15000 |
| Exp. 2 | <100 | <20 | <50 | <20 | <60 | <3* | <1* | <1* | <10* | <20* | <1* | <100 | 300 | 1000 | 15000 | through it from bottom to top in the form of a gas flow 17 which is as laminar as possible; it will leave the reactor 2 by the bore of the quartz glass plunger 11 and is subsequently suctioned off.

Hereinafter, another embodiment of the method according to the invention is explained in more detail on the basis of FIG. 2.

EXAMPLE 2

The quartz grain 21 to be cleaned according to Example 2 is the same grain as that in Example 1. By means of the feeding device, approx. 16 kg of the quartz grain 21 are filled into reactor 2 by forming a loose fill 4 with a filling height of about 60 cm. The reactor 2 is flushed with an inorganically pure HCl gas with a stoichiometric excess of hydrogen which also serves as a treatment gas for cleaning the quartz grains during the following first cleaning stage. With regard to the effect of this rinse during the filling of reactor 2 and especially prior to heating the quartz grain 21, reference is here made to the corresponding explanations for Example 1.

The chamber furnace 1 is set to the treatment temperature of 1,270° C. for heating the fill 4. At the same time, treatment gas at a flow rate of 1300 l/h is passed into the reactor 2 via the quart glass tube 23. The treatment gas is preheated to the treatment temperature by flowing past the heating elements of the chamber furnace 1 within the tubular coil 7. Its volume thereby increases by a multiple. The gas flow 17 of the treatment gas emanating from the quartz glass tube 23 will slightly lift up the fill 4 by forming a fluidized bed; it flows through the fill 4 largely laminarly at a flow velocity of about 60 cm/s and thereby heats the quartz grain to a temperature of around 1,270° C. With regard to the effects of the fluidized bed and the laminar gas flow 17 of the treatment gas, reference is also made to the above explanations for Example 1. By means of the filling device 20, reactor 2 is continuously charged with about 130 g/min of quartz grain 21, and the same amount is continuously removed via the drain connecting piece 24 so that the fill volume in reactor 2 remains approximately the same. The average dwell time of the quartz grain 21 in reactor 2 is approx. 12 hours.

In a separate procedure, carbon and carbon compounds are removed from the thus cleaned quartz grain by treating it with an oxygen containing gas.

Despite the relatively short treatment period of 12 hours, the content of alkaline contaminations in particular will be significantly reduced with the quartz grain thus treated. The concentrations indicated in Table 1 relate to ppb by weight. The contamination contents were measured by means of ICP-OES; the values designated by an * by means of ICP-MS

What is claimed is:

1. A method for cleaning SiO2 particles, said method comprising:
   heating a fill of the particles in a reactor with a vertically oriented center axis (3); and
   exposing the fill at the same time to a treatment gas which is passed generally upwardly through the reactor and the fill at a specific flow velocity
   the treatment gas being a chloric treatment gas and in the area of the fill the treatment gas having a treatment temperature of at least 1,000° C. and the flow velocity being set to at least 10 cm/s.

2. A method according to claim 1, wherein the temperature of the treatment gas is set to at least 1,200° C. in the area of the fill.

3. A method according to claim 1, wherein the treatment gas lifts up the fill by forming a fluidized particle layer.

4. A method according to claim 3, wherein the treatment gas is introduced into the fluidized particle layer in the form of a laminar gas flow.

5. A method according to claim 1, wherein, the treatment gas is heated, prior to introduction thereof into the fill to the treatment temperature or to a temperature above the treatment temperature.

6. A method according to claim 1, wherein inorganic hydrochloric gas is used as the treatment gas.

7. A method according to claim 1, wherein the treatment gas is introduced into the fill by means of a gas shower underneath the fill, said shower having a plurality of nozzle openings distributed laterally the center axis.

8. A method according to claim 1, wherein the particles are heated to a temperature in the range of the treatment temperature in the absence of air and oxygen.

9. A method according to claim 1, and simultaneously using the treatment gas for air sifting of the fill.

10. A method according to claim 1, and further comprising a first cleaning stage for the removal of metallic contaminations or their compounds and a second cleaning stage for the removal of carbon and carbon compounds, an oxygen containing gas being introduced to the treatment gas during the second cleaning stage.

11. A method according to claim 1, wherein the treatment gas is circulated.

12. A method according to claim 1, wherein the flow velocity of the treatment gas is set to at least 30 cm/s.

* * * * *